No Printed Specification Available
6817X
S. Richards,
Knob.
Patented Oct. 31, 1831.
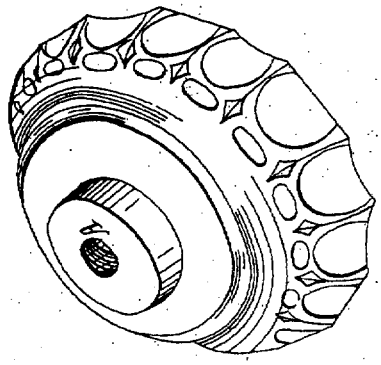
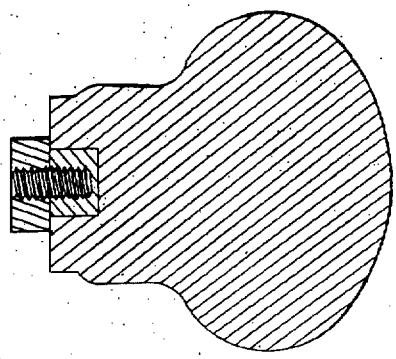
AM. PHOTO-LITHO. CO. N.Y. (OSBORNE'S PROCESS.)

10/31/1831 6817X

Spencer Richards of Cambridge, Massachusetts

[illegible] Patent

The Schedule referred to in these Letters Patent and making part of the same, containing a description in the words of the said Spencer Richards himself of his improvement in making Glass Knobs.

To all to whom these presents shall come

Be it known that I Spencer Richards of Cambridge in the County of Middlesex & State of Massachusetts, have invented a new and useful improvement in the formation of Glass Knobs, for drawers, bureaus and other articles of furniture, curtain pins, doors, shutters &c of pressed or cast glass, and that the following is a full and exact description of the construction and operation of said glass knobs as improved by me.

Said knobs are formed of melted glass, pressed or cast in a mould and are made of any figure or pattern. They are made by placing on the [illegible] of spear or spindle rising from the bottom of the mould a metallic nut, on which the melted glass is placed, and by pressing down the top of the mould, the metallic nut is left [illegible] in the glass with a hole or aperture from the end or bottom of the knob formed by the spear or spindle rising from the bottom of the mould on which the metallic nut is placed, for the purpose of screwing on a metallic rod or spindle with a binding nut to [illegible] the spindle, [illegible], of sufficient length and strength to pass through the side of drawers, or can be screwed [illegible] without having the screw pass through the wood [illegible] as is now the case.

What I claim as new and as my own invention in the above description [illegible] and for the use of which I ask an exclusive [illegible] of glass knobs, having a nut or [illegible] glass knob in which a metallic nut [illegible]

[illegible]

[illegible]

[illegible]

[illegible]

[illegible]